United States Patent [19]

Sugiyama et al.

[11] 4,014,796
[45] Mar. 29, 1977

[54] STRAINER

[75] Inventors: Masaaki Sugiyama, Fuji; Takuo Yuda, Sagamihara; Akira Mizusawa, Fujisawa, all of Japan

[73] Assignees: Yamakawa Industry Company Ltd., Fuji; Nifco Inc., Tokyo, both of Japan

[22] Filed: June 6, 1975

[21] Appl. No.: 584,664

[30] Foreign Application Priority Data

June 8, 1974 Japan .................. 49-65378

[52] U.S. Cl. .................. 210/437; 55/500; 55/DIG. 31; 210/459; 210/497 R
[51] Int. Cl.² .......................... B01D 35/28
[58] Field of Search .......... 210/447, 459, 463, 484, 210/485, 497, 495, 499, 483; 55/500, DIG. 31

[56] References Cited

UNITED STATES PATENTS

| | | | |
|---|---|---|---|
| 1,212,844 | 1/1917 | Sweeney | 210/497 X |
| 1,693,741 | 12/1928 | Wuest | 210/497 X |
| 3,016,984 | 1/1962 | Getzin | 55/500 X |
| 3,486,626 | 12/1969 | Close | 55/500 X |
| 3,633,753 | 1/1972 | Petitjean | 210/497 X |

*Primary Examiner*—Bernard Nozick
*Assistant Examiner*—William A. Cuchlinski, Jr.
*Attorney, Agent, or Firm*—Jack R. Halvorsen; Robert W. Beart

[57] ABSTRACT

Disclosed are a strainer and a method of injection-moulding the strainer of plastics. A strainer according to this invention comprises a pair of semi-cylindric shells integrally and movably connected along their adjacent longitudinal sides in the state of being developed; top and bottom circular boards integrally connected to the top and bottom frames of one of said semi-cylindric shells; and nets integrally connected to each of said semi-cylindric shells. This developed structure of the strainer makes it possible to injection-mould a semi-product of strainer as a whole in a single injection-mould die, and a so moulded and developed strainer is easily assembled in the final and complete cylindric shape by simply closing the semi-cylindric shells and integrally connecting them along their abutting longitudinal sides.

5 Claims, 9 Drawing Figures

Fig. 2
Fig. 1
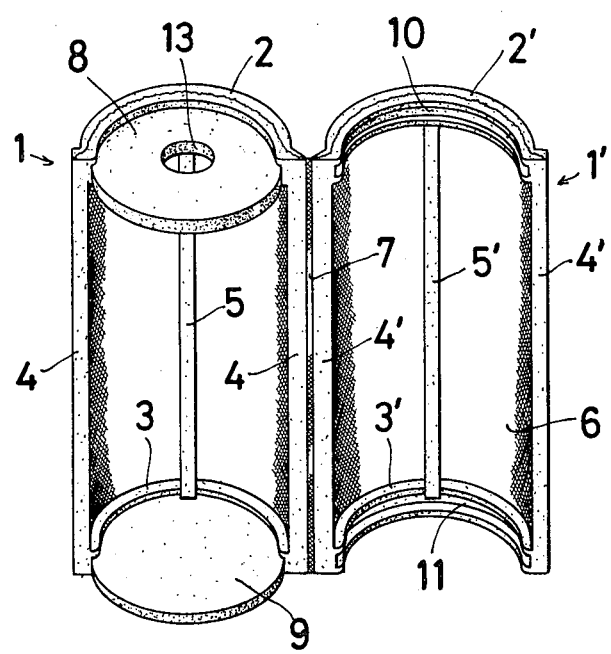
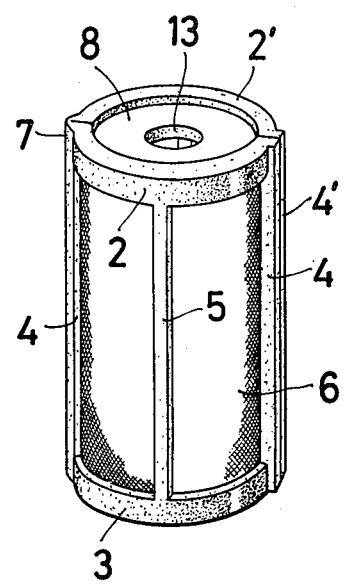
Fig. 4
Fig. 3
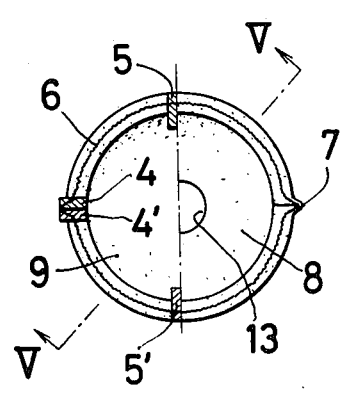
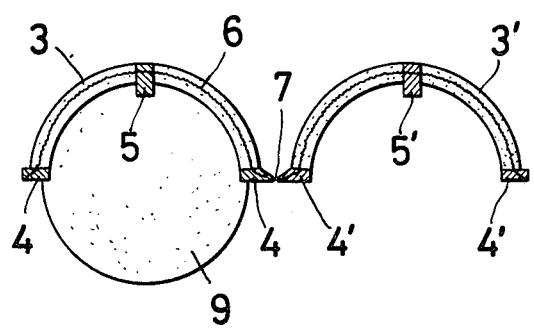

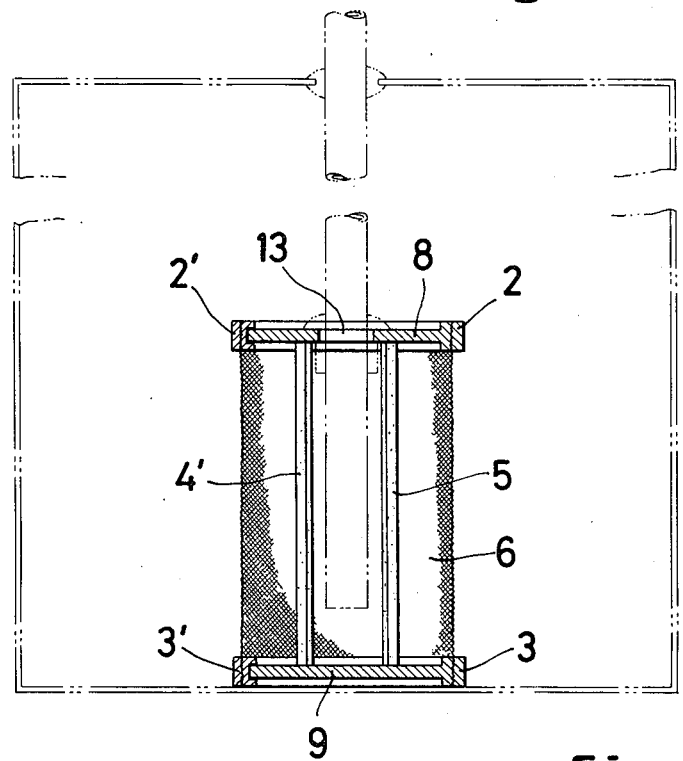
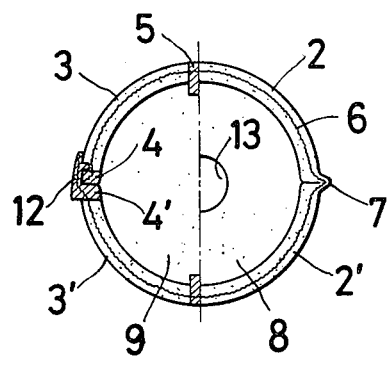
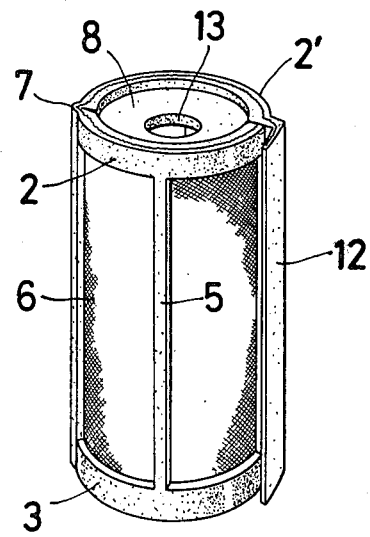

STRAINER

BACKGROUND OF THE INVENTION

This invention relates to a strainer for use in filtering and a method of manufacturing such a strainer of plastics. More specifically, a strainer of the type to which this invention relates, is the cylindrical one which is to be attached to the end of a suction pipe for removing impurities from the fuel in supplying from a gasoline tank.

A variety of such strainers have been hitherto proposed, and actually used. Same of these conventional strainers are composed of a metallic cylindrical frame having a metallic net applied to the whole cylindrical surface thereof. Others are composed of a plastic cylindrical frame having a plastic net embedded in and integrally connected to the body of the frame.

As for the strainer of the former type, applying a net around the frame body requires a tedious and time-consuming work, and therefore such metallic strainers cannot be produced at a low cost. As for the strainer of the latter type, the top and bottom plastic boards cannot be integrally connected to the opposite ends of the plastic cylindrical frame at the time of moulding. Because if the top and bottom boards were integrally connected to the opposite ends of the frame body in a mould die, these boards would prevent the moulded body from being removed from the mould die. In this connection the top and bottom boards are made separately from the cylindrical frame body, and later those boards are connected to the opposite ends of the cylindrical frame to constitute a closed body. Apparently, the separate moulding and subsequent connecting work are disadvantageous to massproduction.

One object of this invention is to provide a strainer which is free from the defects mentioned above.

Another object of this invention is to provide a method of making such strainers.

SUMMARY OF THE INVENTION

To attain these objects a plastic strainer according to this invention comprises a pair of semi-cylindric shells integrally connected along adjacent longitudinal sides in the state of being opened, top and bottom boards integrally connected to the top and bottom frames of one of said semi-cylindric shells; and plastic nets embedded in and integrally connected to each of said semi-cylindric shells. This structure of the strainer permits a simultaneous moulding in an integrated form, and a so moulded strainer is easily assembled by simply closing the semi-cylindric shells to form a closed body.

BRIEF EXPLANATION OF THE DRAWINGS

These and other objects and advantages of this invention will be better understood from the following description which is made with reference to the drawings:

FIG. 1 is a perspective view of one embodiment according to this invention.

FIG. 2 is a perspective view of the strainer in the state of being opened.

FIG. 3 is a cross-section of the two semi-cylindric shells in the state of being opened.

FIG. 4 is a plane view, left half in section, of the strainer as shown in FIG. 1.

FIG. 5 is a longitudinal section taken along the line V—V of FIG. 4 and as seen in the direction indicated by arrows.

FIG. 6 is a perspective view of another embodiment according to this invention.

FIG. 7 is a plane view, left half in section, of the strainer of FIG. 6.

DETAILED DESCRIPTION OF THE INVENTION

Figure 8:
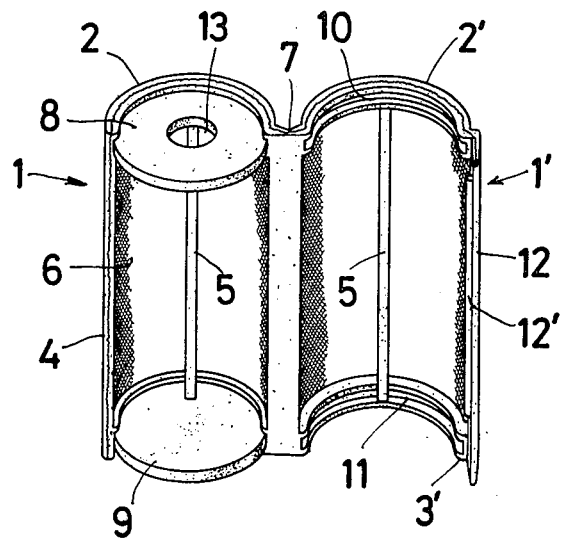
FIG. 8 is a perspective view of the semi-cylindric shells in the state of being developed.
Figure 9:
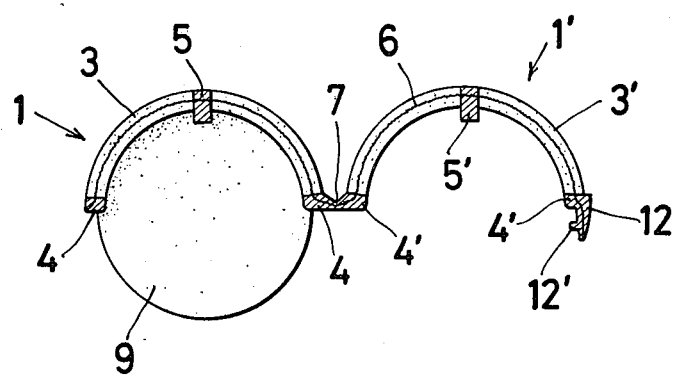
FIG. 9 is a cross-section of the strainer in the state of being developed.

FIGS. 1 to 5 show one embodiment of this invention whereas FIGS. 6 – 9 show another embodiment of this invention.

As seen from these drawings, a strainer according to this invention comprises two semi-cylindric shells 1 (male) and 1' (female) in the state of being developed. These semi-cylindric shells have top and bottom semi-circular frames 2, 3 (male) and 2', 3' (female), a pair of end supporters 4, 4' and a center supporter 5, 5' both connected to the top and bottom frames, respectively. These semi-cylindric shells can be injection-moulded in a single and integral form in a mould die. The two semi-cylindric shells are integrally connected along their adjacent end supporters.

A net 6 as large as the circumference area of the cylinder is put in the injection die, and therefore the net 6 is embedded and integrally connected to the semi-cylindric bodies in a single injection-moulding operation. The two semi-cylindric shells are connected along one longitudinal ends thereof by the net, and the part of the net connecting two adjacent end supporters constitutes a hinge portion 7 to allow the two semi-cylindric shells to open and close thereabout.

In a single injection-moulding a pair of semi-cylindric shells 1 and 1' are hinged along their adjacent end supporters by a corresponding part of the net whereas top and bottom boards 8 and 9 are integrally connected to the top and bottom semi-circular frames 2 and 3 of one of the semi-cylindric shells, and at the same time grooves 10 and 11 which are adapted to catch the top and bottom boards are made on the inner surfaces of the top and bottom frames of the other semi-cylindric shell.

As mentioned above, a pair of semi-cylindric shells are injection-moulded in the integrated form in a single die and these shells are laid and closed on each other by abutting the end supporter 4 of one of the shells to the counter end supporter 4' of the other shell, and at the same time by fitting the top and bottom circular boards 8 and 9 of the one shell in the grooves 10 and 11 of the top and bottom frames of the other shell, thus providing a complete closed and hollow cylindrical body. As for the first embodiment, the longitudinal abutment of the end supporters 4 and 4' of the two shells is welded by applying and moving a heated paint (not shown) on the full length of abutment, thus completing a cylindric body of strainer.

Alternatively, the integral connection of the end supporters may be made by applying an adhesive agent to the opposite end supporters. Otherwise, as adopted in the second embodiment shown in FIGS. 6 – 9, an engaging part 12 having nail catches 12' may be integrally connected to the end supporter of one shell. Thus, in assembling, the engaging part 12 is laid on the end supporter of the other shell to allow the nail catches to catch the counter end supporter of the one shell.

A suction pipe is inserted in the through hole 13 of the top board 8 of the strainer, and then the strainer is soaked in the gasoline tank as shown in FIG. 5.

As mentioned above, a strainer according to this invention is injection-moulded in the form of being developed, together with the net integrally connected to the cylindric surfaces of the two halves. The part of the net connecting these two halves is capable of functioning as a movable joint to allow them to open and close. This structure of the strainer is very advantageous to massproduction of strainers at a low cost.

The net is described as made of plastics, but a metallic net may be equally used if it is put in an injection die before moulding and is integrally connected to the mould.

What is claimed is:

1. A strainer comprising:
   a. a filter net,
   b. a semi-cylindrical male shell having a pair of end supporters and a center supporter, top and bottom male frames of semi-circular shape connected with each other by said supporters and top and bottom boards of circular shape connected to said top and bottom frames and each presenting a substantially semi-circular lateral extension,
   the top board having a through hole adapted to complimentarily accept a suction pipe therethrough,
   c. a semi-cylindrical female shell having a pair of end supporters and a center supporter, and top and bottom female frames of semi-circular shape connected with each other by said supporters and groove means on the inside surface of each female frame,
   the top and the bottom female frame grooves being adapted to cooperatively accept said lateral extensions of said top and said bottom boards therein respectively, said top and bottom boards closing the top and bottom frames of said male and female shells respectively, said male and female shells being movably connected with each other adjacent respective end supporters by suitable hinge means, said net being integrally attached to the peripheries of said male and female shells, said connected male and female shells adapted to be made to come closely into contact with each other by rotation about said hinge means and means for connecting the other said end supporters positioned remote from said hinge means.

2. A device of the type claimed in claim 1 wherein said means for connecting the other said end supporters is an adhesive agent.

3. A device to the type claimed in claim 1 wherein said means for connecting the other said end supporters includes mutually cooperative snap engaging means.

4. A device of the type claimed in claim 1 in which said filter net is insert-molded within said semi-cylindrical male and female shells intermediate their radially inner and outer dimensions.

5. A device of the type claimed in claim 4 wherein said net is a continuous one-piece element and serves as said hinge means.

* * * * *